(12) United States Patent
Oda et al.

(10) Patent No.: US 9,744,984 B2
(45) Date of Patent: Aug. 29, 2017

(54) BUSH BEARING AND RACK-AND-PINION TYPE STEERING APPARATUS FOR AUTOMOBILE USING THE SAME

(71) Applicant: OILES CORPORATION, Minato-ku, Tokyo (JP)

(72) Inventors: Shunya Oda, Fujisawa (JP); Yosuke Nishitani, Fujisawa (JP); Noboru Nakagawa, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 197 days.

(21) Appl. No.: 14/422,536

(22) PCT Filed: Jun. 18, 2013

(86) PCT No.: PCT/JP2013/003797
§ 371 (c)(1),
(2) Date: Feb. 19, 2015

(87) PCT Pub. No.: WO2014/033992
PCT Pub. Date: Mar. 6, 2014

(65) Prior Publication Data
US 2015/0251685 A1    Sep. 10, 2015

(30) Foreign Application Priority Data
Aug. 30, 2012    (JP) ................................ 2012-190692

(51) Int. Cl.
*F16H 1/04*    (2006.01)
*B62D 3/12*    (2006.01)
(Continued)

(52) U.S. Cl.
CPC ............... *B62D 3/12* (2013.01); *F16C 27/04* (2013.01); *F16C 29/02* (2013.01); *F16C 33/20* (2013.01);
(Continued)

(58) Field of Classification Search
CPC .......... F16C 33/20; F16C 35/02; F16C 29/02; B62D 3/12
See application file for complete search history.

(56) References Cited

U.S. PATENT DOCUMENTS

| 7,220,056 B2 * | 5/2007 | Kubota | .................... B62D 1/16 384/215 |
| 7,798,504 B2 * | 9/2010 | Hirose | .................... B62D 3/12 280/93.514 |

(Continued)

FOREIGN PATENT DOCUMENTS

| CN | 1493795 A | 5/2004 |
| CN | 100383421 C | 4/2008 |

(Continued)

OTHER PUBLICATIONS

International Search Report for PCT/JP2013/003797 dated Sep. 24, 2013, 2 pages.

(Continued)

*Primary Examiner* — Jake Cook
(74) *Attorney, Agent, or Firm* — Nixon & Vanderhye P.C.

(57) ABSTRACT

A bush bearing 7 includes a synthetic resin-made bush 17 having a circumferential groove 16 on an outer peripheral surface 15 thereof; an endless annular elastic member 18 fitted in the circumferential groove 16 of the bush 17; and a positioning means 19 for determining the position of the bush 17 in a B direction with respect to an inner peripheral surface 12 of a gear housing 6.

9 Claims, 8 Drawing Sheets

(51) Int. Cl.
*F16C 35/02* (2006.01)
*F16C 29/02* (2006.01)
*F16C 33/20* (2006.01)
*F16C 27/04* (2006.01)

(52) U.S. Cl.
CPC .......... *F16C 35/02* (2013.01); *F16C 2208/10* (2013.01); *F16C 2208/60* (2013.01); *F16C 2208/76* (2013.01); *F16C 2240/30* (2013.01); *F16C 2326/24* (2013.01); *F16C 2361/61* (2013.01); *Y10T 74/1967* (2015.01)

(56) References Cited

U.S. PATENT DOCUMENTS

| | | | |
|---|---|---|---|
| 2004/0076353 A1 | 4/2004 | Kubota et al. | |
| 2006/0076180 A1* | 4/2006 | Saito | B62D 3/12 180/428 |
| 2011/0016997 A1* | 1/2011 | Oki | B62D 3/12 74/29 |

FOREIGN PATENT DOCUMENTS

| | | |
|---|---|---|
| CN | 101410638 A | 4/2009 |
| JP | 2000-177606 A | 6/2000 |
| JP | 3543652 | 7/2004 |
| JP | 2004-347105 | 12/2004 |
| JP | 2007-187285 | 7/2007 |

OTHER PUBLICATIONS

Notice on the First Office Action dated May 4, 2016 in Chinese Application No. 201380044828.0, with English Translation (18 pages).

\* cited by examiner

BUSH BEARING AND RACK-AND-PINION TYPE STEERING APPARATUS FOR AUTOMOBILE USING THE SAME

This application is the U.S. national phase of International Application No. PCT/JP2013/003797, filed 18 Jun. 2013, which designated the U.S. and claims priority to JP 2012-190692, filed 30 Aug. 2012, the entire contents of each of which are hereby incorporated by reference.

TECHNICAL FIELD

The present invention relates to a bush bearing, and more particularly to a bush bearing suitably used to movably support a rack shaft in a rack-and-pinion type steering apparatus for an automobile.

BACKGROUND ART

In a rack-and-pinion type steering apparatus, a rack shaft having rack teeth meshing with the teeth of a pinion is movably supported through a bush bearing by a gear box serving as a housing. As bush bearings, synthetic resin-made bush bearings have been variously proposed, and such a synthetic resin-made bush bearing is generally adapted to movably support the rack shaft with an interference (refer to Patent Document 1).

In the synthetic resin-made bush bearing, if a large interference is provided for the rack shaft to be supported, the rack shaft can be supported firmly in an radial direction thereof with predetermined rigidity. However, since the rack shaft is tightened tightly, frictional resistance against sliding in the axial direction becomes large, so that it becomes impossible to support the rack shaft with a satisfactory moving characteristic. On the other hand, if a small interference is provided for the rack shaft to be supported, a satisfactory axially moving characteristic having low frictional resistance against sliding on the rack shaft can be expected. However, a large axial offset of the rack shaft and a gap between the bush bearing and the rack shaft, among others, are likely to occur, so that the rigid support in the radial direction disadvantageously declines.

To overcome the above-described aspects, in Patent Document 2, a bush bearing is proposed which is comprised of: a synthetic resin-made bush having at least one circumferential groove in an outer peripheral surface thereof; and an endless annular elastic member which is fitted in the circumferential groove of the bush, wherein the bush has a pair of inside inner peripheral surfaces which are disposed axially symmetrically; a pair of slits which are each disposed with one of the inside inner peripheral surfaces located therebetween in a circumferential direction, and allow that inside inner peripheral surface to be movable in a radially inward/outward direction; another pair of slits which are each disposed with the other one of the inside inner peripheral surfaces located therebetween in the circumferential direction, and allow that inside inner peripheral surface to be movable in the radially inward/outward direction; and at least one pair of outside inner peripheral surfaces disposed on an outer side than the pair of inside inner peripheral surfaces in a radial direction, wherein each of the outside inner peripheral surfaces is adapted to form a gap with a corresponding one of outer peripheral surfaces on a rack teeth side and an opposite side to the rack teeth side of a rack shaft which is inserted and fitted in a through hole defined by the pair of inside inner peripheral surfaces and the pair of outside inner peripheral surfaces, and wherein each of the inside inner peripheral surfaces at least at the portion is adapted to slidably come into contact with a corresponding outer peripheral surface of the rack shaft, excluding outer peripheral surfaces on the rack teeth side and the opposite side to the rack teeth side of the rack shaft.

PRIOR ART DOCUMENTS

Patent Documents
  Patent Document 1: Japanese Patent No. 3543652
  Patent Document 2: JP-A-2007-187285

SUMMARY OF THE INVENTION

Problems that the Invention is to Solve

Meanwhile, the rack shaft is generally supported movably by the bush bearing at two portions on a side adjacent to the pinion and a side remote from the pinion. Particularly at the portion of the rack shaft on the side adjacent to the pinion, radial displacements, such as a displacement in the axial direction of the pinion and a displacement in the direction of approaching or moving away from the pinion, can occur due to the effect of meshing between the teeth of the pinion and the rack teeth, so that there is a possibility that the steering feel becomes substantially deteriorated.

Furthermore, with the synthetic resin-made bush bearing, a gap can occur between the bush bearing and the rack shaft due to the creep deformation of the synthetic resin, so that there is a possibility of lowering the rigid support in the radial direction. In addition, in a case where radial shrinkage, in particular, occurs due to the stress relaxation of the synthetic resin consequent upon a thermal history, there is a possibility that the interference with the rack shaft increases, resulting in a large sliding frictional resistance.

In addition, if the synthetic resin-made bush bearing is used for slidably supporting the rack shaft in the rack-and-pinion type steering apparatus for an automobile, the interior of the gear box of the rack-and-pinion type steering apparatus is sealed, and the influx and efflux of air in the gear box becomes difficult. Hence, as air is forcibly caused to flow in and out, there are possibilities that abnormal noise can occur, and that early disappearance of a lubricant such as grease applied to the gap between the bush bearing and the rack shaft can occur.

The present invention has been devised in view of the above-described aspects, and its object is to provide a bush bearing and a rack-and-pinion type steering apparatus for an automobile using the same, which make it possible to support the rack shaft satisfactorily without causing radial displacement to occur and make it possible to reduce the effect of stress relaxation consequent upon creep deformation and thermal history.

Means for Solving the Problems

A bush bearing in accordance with the present invention for allowing a rack shaft meshing with a pinion to be supported movably in an axial direction of the rack shaft, comprises: a synthetic resin-made bush having at least one circumferential groove in an outer peripheral surface thereof; and an endless annular elastic member which is fitted in the circumferential groove of the bush, wherein the bush has an inner peripheral surface defining a through hole in which the rack shaft is inserted and fitted; at least one slit which partially severs the inner peripheral surface in a circumferential direction; a first contact portion which is formed on the inner peripheral surface so as to slidably come into contact with an outer peripheral surface of the rack shaft on a line extending in a direction perpendicular to the axial direction of the rack shaft and an axial direction of the pinion; and second and third contact portions which are formed on the inner peripheral surface in such a manner as to be respectively arranged with an interval with respect to the first contact portion in the circumferential direction with the first contact portion interposed therebetween in the circumferential direction and so as to slidably come into contact with the outer peripheral surface of the rack shaft, and wherein the inner peripheral surface at portions excluding the first to third contact portions is adapted to form a gap with respect to the outer peripheral surface of the rack shaft.

According to the bush bearing in accordance with the present invention, since the bush has the first to third contact portions, it is possible to eliminate the possibility of occurrence of radial displacements, such as a displacement in the axial direction of the pinion and a displacement in the direction of approaching or moving away from the pinion. Moreover, since the inner peripheral surface at portions excluding the first to third contact portions formed on that inner peripheral surface is adapted to form a gap with respect to the outer peripheral surface of the rack shaft, coupled with the above, it is possible to reduce the effect of stress relaxation consequent upon creep deformation and thermal history.

As the synthetic resin as the material for forming the bush, one which excels in abrasion resistance, has a low friction characteristic, and has predetermined flexibility and rigidity and small thermal expansion and contraction is preferable. Specifically, it is possible to cite, among others, a synthetic resin which includes at least one of polyacetal resin, polyamide resin, polyolefin resin, and fluoro resin.

The endless annular elastic member in a cross section thereof has a circular shape, an elliptical shape, a rectangular shape, or a flattened oval shape; however, the present invention is not limited to the same, and it is possible to adopt another shape such as an X-cross-sectional shape, a U-cross-sectional shape, or a trapezoidal cross-sectional shape. Preferably, the endless annular elastic member is formed of natural rubber or synthetic rubber, or may be another elastic thermoplastic synthetic resin, e.g., a polyester elastomer. As such an endless annular elastic member, it is possible to suitably use an O-ring which is generally used. The endless annular elastic member which is fitted in the circumferential groove may protrude partially from the outer peripheral surface of the bush. Alternatively, the endless annular elastic member may be disposed in an entirety thereof in the circumferential groove and may protrude from the outer peripheral surface of the bush. In the case where the endless annular elastic member protrudes partially, the endless annular elastic member may be adapted to come into contact at the outer peripheral surface with the inner peripheral surface of the housing in which the bush bearing is fitted, or the endless annular elastic member may alternatively be adapted to form an annular gap between the outer peripheral surface and the inner peripheral surface of the housing.

The bush may have at least one circumferential groove in an outer peripheral surface thereof. In a case where the bush has a plurality of circumferential grooves in the outer peripheral surface, endless annular elastic members may be fitted in the respective circumferential grooves.

The second and third contact portions are preferably arranged bilaterally symmetrically about the line.

The second and third contact portions are preferably each arranged at an equiangular interval with respect to the first contact portion in the circumferential direction.

The first to third contact portions may respectively have inside inner peripheral surfaces which slidably come into contact with the outer peripheral surface of the rack shaft, the inner peripheral surface of the bush may have outside inner peripheral surfaces which are disposed outwardly of the first to third contact portions in a radial direction and are arranged with a gap with respect to the outer peripheral surface of the rack shaft between the first and second contact portions, between the first and third contact portions, and between the second and third contact portions, respectively.

Each of the inside inner peripheral surfaces in a preferred example has a flat surface shape, but may alternatively have a convex surface shape or a concave surface shape having a radius of curvature equal to or greater than the radius of curvature of the cylindrical outer peripheral surface of the rack shaft.

Each of the inside inner peripheral surfaces suffices if it has a center angle $\theta 1$ about the center of the rack shaft to such an extent that each of the inside inner peripheral surfaces at least at a portion thereof slidably comes into contact with the outer peripheral surface, excluding the rack teeth side, of the rack shaft, and is thereby capable of supporting the rack shaft in the radial direction with predetermined rigidity. Preferably, each of the inside inner peripheral surfaces has a center angle $\theta 1$ of not less than 5° and not more than 90° about the center of the rack shaft. Each of the inside inner peripheral surfaces at the portion or in an entirety thereof may be in slidable contact with a corresponding outer peripheral surface, excluding the rack teeth side, of the rack shaft.

In the bush bearing in accordance with the present invention, preferably, an angle at which a perpendicular line in an isosceles triangle formed by two sides respectively extending in the radial direction toward the center of the rack shaft from both edges in the circumferential direction of the inside inner peripheral surface of the first contact portion and by a side connecting the both edges and a perpendicular line in an isosceles triangle formed by two sides respectively extending in the radial direction toward the center of the rack shaft from both edges in the circumferential direction of the inside inner peripheral surface of the second contact portion and by a side connecting the both edges intersect each other, is identical to an angle at which the perpendicular line in an isosceles triangle formed by two sides respectively extending in the radial direction toward the center of the rack shaft from both edges in the circumferential direction of the inside inner peripheral surface of the first contact portion and by a side connecting the both edges and a perpendicular line in an isosceles triangle formed by two sides respectively extending in the radial direction toward the center of the rack shaft from both edges in the circumferential direction of the inside inner peripheral surface of the third contact portion and by a side connecting the both edges intersect each other.

Each of the first to third contact portions may protrude from the inner peripheral surface of the bush toward the center of the rack shaft.

In addition, in the bush bearing in accordance with the present invention, the inner peripheral surface of the bush may be constituted by three convex-shaped, concave-shaped, or flat-shaped surfaces which are continuous to each other, and the first to third contact portions may be respectively formed on the three surfaces.

In a preferred example, the at least one slit is open at one of one end face and another end face in the axial direction of the bush and extends in the axial direction from the one of the one end face and the other end face to a vicinity of another one of the one end face and the other end face in the axial direction of the bush past the circumferential groove. Each of such slits may extend in parallel with the axial direction or may alternatively extend in such a manner as to be inclined with respect to the axial direction. Furthermore, in a case where there are at least two slits, one of the two slits may extend in parallel with the axial direction, and the other one of the two slits may extend in such a manner as to be inclined with respect to the axial direction.

The bush may have a main body portion including the inner peripheral surface, the first to third contact portions, the outer peripheral surface, and the circumferential groove, as well as a plurality of protrusions provided integrally on the outer peripheral surface of the main body portion and spaced apart from each other in the circumferential direction, and the plurality of protrusions may be adapted to come into contact with an inner peripheral surface of a housing through which the rack shaft is passed through.

The bush bearing in accordance with the present invention may further comprise: positioning means for determining a position of the bush in the circumferential direction with respect to the inner peripheral surface of the housing.

The positioning means in a preferred example may have a projection provided integrally on the bush so as to be fitted in a recess provided in the inner peripheral surface of the housing.

A rack-and-pinion type steering apparatus for an automobile in accordance with the present invention comprises: a pinion; a rack shaft having rack teeth meshing with teeth of the pinion; a housing through which the rack shaft is passed through; and the above-described bush bearing which is fitted in the housing and movably supports the rack shaft with respect to the housing.

In the rack-and-pinion type steering apparatus in accordance with the invention, the housing may be a hollow supporting member for supporting the rack shaft together with the gear housing for accommodating the pinion. Preferably, the housing is a gear housing for accommodating the pinion, and the bush bearing is disposed in the housing, or in the gear housing serving as the housing in a preferred example, so as to movably support the rack shaft on the side adjacent to such a pinion.

Advantages of the Invention

According to the present invention, it is possible to provide a bush bearing and a rack-and-pinion type steering apparatus for an automobile using the same, which make it possible to support the rack shaft satisfactorily without causing radial displacement to occur and make it possible to reduce the effect of stress relaxation consequent upon creep deformation and thermal history.

MODE FOR CARRYING OUT THE INVENTION

Figure 1:
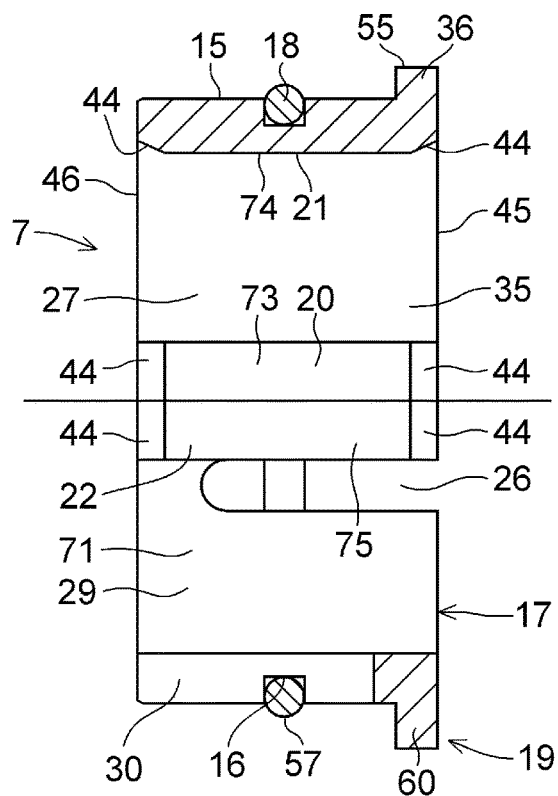
FIG. 1 is a cross-sectional view, taken in the direction of arrows along line I-I shown in FIG. 2, of a preferred embodiment of the invention.

Next, a more detailed description will be given of the mode for carrying out the present invention on the basis of the preferred embodiments illustrated in the drawings. It should be noted that the present invention is not limited to these embodiments.

Figure 7:
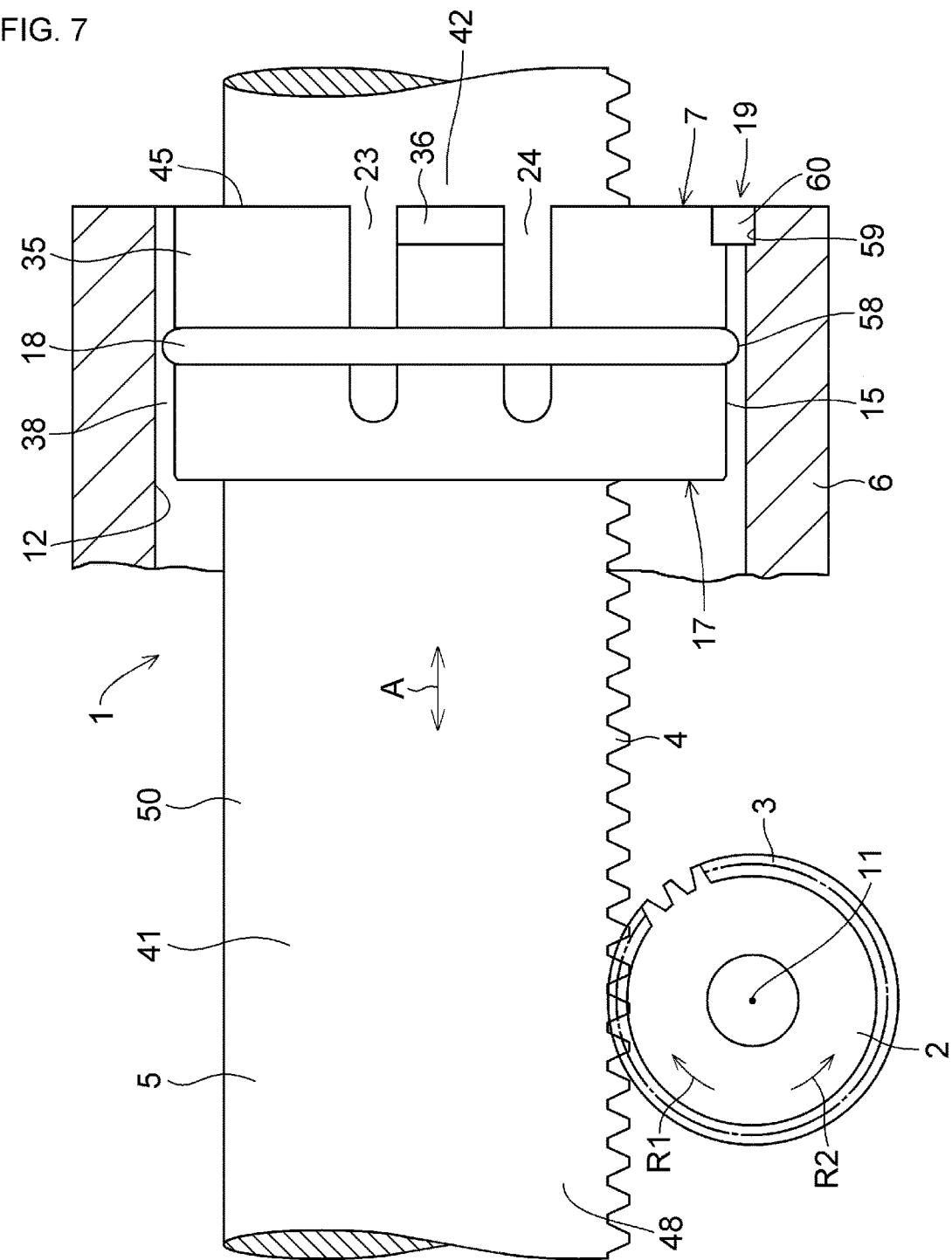
FIG. 7 is an explanatory view of an embodiment in which the embodiment shown in FIG. 1 is used in a rack-and-pinion type steering apparatus for an automobile.
Figure 8:
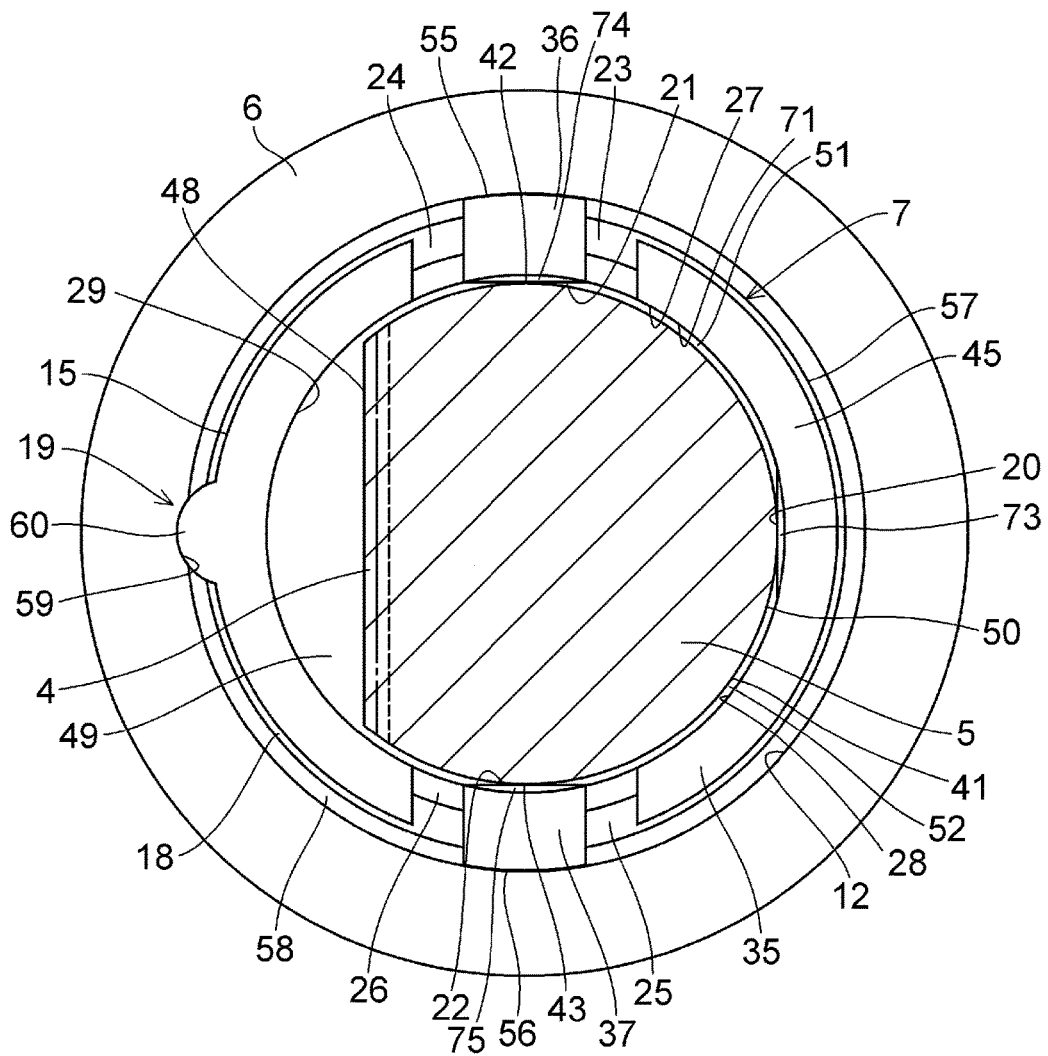
FIG. 8 is a right side elevational view of the embodiment shown in FIG. 7.

In FIGS. 7 and 8, a rack-and-pinion type steering apparatus 1 for an automobile in accordance with this embodiment includes a pinion 2; a rack shaft 5 having rack teeth 4 meshing with teeth 3 of the pinion 2; a gear housing 6 serving as a housing through which the rack shaft 5 is passed through; and a bush bearing 7 which is fitted in the gear housing 6 and supports the rack shaft 5 movably in an A direction, i.e., an axial direction, with respect to the gear housing 6.

The pinion 2 having an axis 11 is adapted to be rotated about the axis 11 in an R1 direction or an R2 direction by the rotation of a steering wheel. The gear housing 6 has a cylindrical inner peripheral surface 12 to which the bush bearing 7 is fitted.

As particularly shown in FIGS. 1 to 5, the bush bearing 7 includes a synthetic resin-made bush 17 having a circumferential groove 16 on an outer peripheral surface 15 thereof; an endless annular elastic member 18 fitted in the circumferential groove 16 of the bush 17 and constituted by an O-ring or the like made of natural rubber or synthetic rubber; and a positioning means 19 for determining the position of the bush 17 in a B direction, i.e., a circumferential direction, with respect to the inner peripheral surface 12 of the gear housing 6.

The bush 17 has a main body portion 35 and two protrusions 36 and 37 which are integrally provided on the outer peripheral surface 15 of the main body portion 35 and are spaced apart from each other with an interval of 180° in the B direction.

In addition to the outer peripheral surface 15 and the circumferential groove 16 mentioned above, the main body portion 35 has a circular arc-shaped inner peripheral surface 71 whose center of curvature is located at a center O; slits 23, 24, 25, 26, and 30 which partially sever the inner peripheral surface 71 in the B direction; a contact portion 73 which is formed on the inner peripheral surface 71 so as to slidably come into contact with an outer peripheral surface 41 of the rack shaft 5 on a line 72 extending in a direction perpendicular to the A direction and the axial direction of the pinion 2; a contact portion 74 which is formed on the inner peripheral surface 71 in such a manner as to be arranged with an interval with respect to the contact portion 73 in the B direction and so as to slidably come into contact with the outer peripheral surface 41 of the rack shaft 5 on one side of the line 72; and a contact portion 75 which is formed on the inner peripheral surface 71 in such a manner as to be arranged with an interval with respect to the contact portion 73 in the B direction and disposed with the contact portion 73 interposed between the same and the contact portion 74 and so as to slidably come into contact with the outer peripheral surface 41 of the rack shaft 5 on the other side of the line 72.

The outer peripheral surface 15 is partially severed in the B direction by the slits 23, 24, 25, 26, and 30, and forms a gap 38 with respect to the inner peripheral surface 12 of the gear housing 6.

The contact portions 74 and 75 in this embodiment are arranged bilaterally symmetrically about the line 72 as an axis of symmetry, and are each arranged at an equiangular interval with respect to the contact portion 73 in the B direction. Each of the contact portions 73, 74, and 75 protrudes from the inner peripheral surface 71 toward the center O of the rack shaft 5. The contact portions 73, 74, and 75 at least at their parts thereof are respectively adapted to slidably come into contact with outer peripheral surfaces 50, 42, and 43, excluding an outer peripheral surface 48 on the rack teeth 4 side, in the outer peripheral surface 41 of the rack shaft 5. The contact portions 73, 74, and 75 respectively have flat-shaped inside inner peripheral surfaces 20, 21, and 22 which are respectively disposed inwardly of the inner peripheral surface 71 in a C direction and slidably come into contact with the outer peripheral surface 41 of the rack shaft 5.

The inside inner peripheral surface 20 has a center angle $\theta 1$ of not less than 5° and not more than 90°, i.e., 30° in this embodiment, about the center O of the rack shaft 5; the inside inner peripheral surface 21 has the center angle $\theta 1$ of not less than 5° and not more than 90°, i.e., 30° in this embodiment, about the center O of the rack shaft 5; and the inside inner peripheral surface 22 has the center angle $\theta 1$ of not less than 5° and not more than 90°, i.e., 30° in this embodiment, about the center O of the rack shaft 5.

The inside inner peripheral surface 20 at a portion thereof is adapted to slidably come into linear contact with the outer peripheral surface 50 on the opposite side to the rack teeth 4 side, excluding the outer peripheral surface 48 on the rack teeth 4 side of the rack shaft 5, in the outer peripheral surface 41 of the rack shaft 5. The inside inner peripheral surface 21 at a portion thereof is adapted to slidably come into linear contact with the outer peripheral surface 42 on one side of the line 72, excluding the outer peripheral surfaces 48 and 50 on the rack teeth 4 side and the opposite side to the rack teeth 4 side of the rack shaft 5, in the outer peripheral surface 41 of the rack shaft 5. The inside inner peripheral surface 22 at a portion thereof is adapted to slidably come into linear contact with the outer peripheral surface 43 on the other side of the line 72, excluding the outer peripheral surfaces 48 and 50 on the rack teeth 4 side and the opposite side to the rack teeth 4 side of the rack shaft 5, in the outer peripheral surface 41 of the rack shaft 5. The inside inner peripheral surfaces 20, 21, and 22 are adapted to come into linear contact with the outer peripheral surface 41, but may be adapted to come into, for example, surface contact therewith. The inside inner peripheral surfaces 21 and 22 in this embodiment are arranged bilaterally symmetrically with an interval of 180° in the B direction. Respective end portions 44 in the A direction of the inside inner peripheral surfaces 20, 21, and 22 may each be terminated with a tapered surface.

An angle $\theta 2$ at which a perpendicular line 81 in an isosceles triangle formed by two sides 78 and 79 respectively extending in the C direction toward the center O of the rack shaft 5 from both edges 76 and 77 in the B direction of the inside inner peripheral surface 20 of the contact portion 73 and by a side 80 connecting the both edges 76 and 77 and a perpendicular line 87 in an isosceles triangle formed by two sides 84 and 85 respectively extending in the C direction toward the center O of the rack shaft 5 from both edges 82 and 83 in the B direction of the inside inner peripheral surface 21 of the contact portion 74 and by a side 86 connecting the both edges 82 and 83 intersect each other, is identical to an angle $\theta 2$ at which the perpendicular line 81 and a perpendicular line 93 in an isosceles triangle formed by two sides 90 and 91 respectively extending in the C direction toward the center O of the rack shaft 5 from both edges 88 and 89 in the B direction of the inside inner peripheral surface 22 of the contact portion 75 and by a side 92 connecting the both edges 88 and 89 intersect each other.

Portions of the inner peripheral surface 71 excluding the portions of the inner peripheral surface 71 where the contact portions 73, 74, and 75 are integrally formed respectively have outside inner peripheral surfaces 27, 28, and 29 which are disposed outwardly of the inside inner peripheral surfaces 20, 21, and 22 of these contact portions 73, 74, and 75 in the C direction. The outside inner peripheral surface 27 is disposed between the inside inner peripheral surfaces 20 and 21 in the C direction; the outside inner peripheral surface 28 is disposed between the inside inner peripheral surfaces 20 and 22 in the C direction; and the outside inner peripheral surface 29 is disposed between the inside inner peripheral surfaces 21 and 22 in the C direction.

The two pairs of slits 23 and 24 as well as 25 and 26 are respectively disposed with the inside inner peripheral surfaces 21 and 22 located therebetween in the B direction, and allow the respective inside inner peripheral surfaces 21 and 22 to be movable in an inward/outward direction in the C direction. The other slit 30 partially severs the outside inner peripheral surface 29 in the B direction.

Each of the pair of slits 23 and 24 disposed with the inside inner peripheral surface 21 located therebetween in the B direction is open at one end face 45 in the A direction of the main body portion 35 of the bush 17, and extends in the A direction from the one end face 45 to a vicinity of another end face 46 in the A direction of the main body portion 35 of the bush 17 past the circumferential groove 16. Each of the pair of slits 25 and 26 disposed with the inside inner peripheral surface 22 located therebetween in the B direction is also open at the one end face 45 in the A direction of the main body portion 35 of the bush 17, and extends in the A direction from the one end face 45 to a vicinity of the other end face 46 in the A direction of the main body portion 35 of the bush 17 past the circumferential groove 16.

The slit 30 is open at the other end face 46 of the main body portion 35 of the bush 17 and extends in the A direction from the other end face 46 to a vicinity of the one end face 45 of the main body portion 35 of the bush 17 past the circumferential groove 16. It should be noted that the main body portion 35 of the bush 17 may be further provided with a slit which partially severs the outside inner peripheral surface 27 in the B direction and a slit which partially severs the outside inner peripheral surface 28 in the B direction. In the same way as the slit 30, both of these slits may be open at the other end face 46 of the main body portion 35 of the bush 17 and may extend in the A direction from the other end face 46 to a vicinity of the one end face 45 of the main body portion 35 of the bush 17 past the circumferential groove 16, or may be arranged bilaterally symmetrically about the line 72 as the axis of symmetry.

The outside inner peripheral surface 27 is adapted to form a circular arc-shaped gap 51 in the C direction with respect to the outer peripheral surface 41 of the rack shaft 5, which is inserted and fitted in a through hole 47 defined by the inside inner peripheral surfaces 20, 21 and 22 and the outside inner peripheral surfaces 27, 28 and 29. The outside inner peripheral surface 28 is adapted to form a circular arc-shaped gap 52 with respect to the outer peripheral surface 41 of the rack shaft 5, and the outside inner peripheral surface 29 is adapted to form a circular arc-shaped gap 49 with respect to the outer peripheral surface 48 on the rack teeth 4 side in the outer peripheral surface 41 of the rack shaft 5. Thus, the inner peripheral surface 71 is adapted to form the gaps 49, 51, and 52 with respect to the outer peripheral surface 41 of the rack shaft 5 which is inserted and fitted in the through hole 47 defined by the inner peripheral surface 71 and the contact portions 73, 74, and 75.

The protrusion 36 having a cylindrical outer peripheral surface 55 is disposed by being sandwiched by the pair of slits 23 and 24 in the B direction and, at the outer peripheral surface 55, is adapted to come into tight contact with the inner peripheral surface 12 of the gear housing 6, through which the rack shaft 5 is passed through, with the elastic force of the synthetic resin-made bush 17. The protrusion 37 having a cylindrical outer peripheral surface 56 is disposed by being sandwiched by the pair of slits 25 and 26 in the B direction and, at the outer peripheral surface 56, is adapted to come into tight contact with the inner peripheral surface 12 of the gear housing 6, through which the rack shaft 5 is passed through, with the elastic force of the synthetic resin-made bush 17. Thus, the bush 17 is fitted to the inner peripheral surface 12 of the gear housing 6 by means of the protrusions 36 and 37.

The endless annular elastic member 18 forms an annular gap 58 between an outer peripheral surface 57 thereof and the inner peripheral surface 12 of the gear housing 6, the annular gap 58 being narrower than the gap 38. The endless annular elastic member 18 is fitted in the circumferential groove 16 in such a manner as to protrude partially from the outer peripheral surface 15 so as to slightly reduce the diameter of the main body portion 35 of the bush 17.

The positioning means 19 has a projection 60 formed integrally on the outer peripheral surface 15 of the main body portion 35. The projection 60 is engaged with the gear housing 6, i.e., in a recess 59 formed in the inner peripheral surface 12 of the gear housing 6, at a leading end portion thereof in the C direction and an end face thereof in the A direction. This ensures that the bush 17 does not rotate relative to the gear housing 6 in the B direction and is not inserted into the gear housing 6 more than is necessary. Further, the inside inner peripheral surfaces 20, 21, and 22, the protrusions 36 and 37, and the slits 23, 24, 25, 26, and 30 are disposed by being positioned with respect to the rack teeth 4 of the rack shaft 5.

In the above-described rack-and-pinion type steering apparatus 1, the bush bearing 7 includes the synthetic resin-made bush 17 having at least one circumferential groove 16 on the outer peripheral surface 15 and the endless annular elastic member 18 fitted in the circumferential groove 16 of the bush 17, wherein the bush 17 has the inner peripheral surface 71; at least one of the slits 23, 24, 25, 26, and 30 which partially sever the inner peripheral surface 71 in the B direction; the contact portion 73 which is formed on the inner peripheral surface 71 so as to slidably come into contact with the outer peripheral surface 41 of the rack shaft 5 on the line 72 extending in a direction perpendicular to the A direction of the rack shaft 5 and the axial direction of the pinion 2; the contact portion 74 which is formed on the inner peripheral surface 71 in such a manner as to be arranged with an interval with respect to the contact portion 73 in the B direction and so as to slidably come into contact with the outer peripheral surface 41 of the rack shaft 5 on one side of the line 72; and the contact portion 75 which is formed on the inner peripheral surface 71 in such a manner as to be arranged with an interval with respect to the contact portion 73 in the B direction and disposed with the contact portion 73 interposed between the same and the contact portion 74 and so as to slidably come into contact with the outer peripheral surface 41 of the rack shaft 5 on the other side of the line 72, and wherein, at portions excluding the contact portions 73, 74, and 75 formed on the inner peripheral surface 71, the inner peripheral surface 71 is adapted to form the gaps 49, 51, and 52 with respect to the outer peripheral surface 41 of the rack shaft 5 which is inserted and fitted in the through hole 47 defined by that inside inner peripheral surface 71 and the contact portions 73, 74, and 75. Therefore, it is possible to eliminate the possibility of occurrence of displacements in the C direction, such as the displacement in the axial direction of the pinion 2 and the displacement in the direction of approaching or moving away from the pinion 2, and reduce the effect of stress relaxation consequent upon creep deformation and thermal history.

In the rack-and-pinion type steering apparatus 1, the bush 17 has the pair of flat-shaped inside inner peripheral surfaces 21 and 22 and the two pairs of slits 23 and 24 as well as 25 and 26, which are respectively disposed with the inside inner peripheral surfaces 21 and 22 located therebetween in the B direction, and allow the respective inside inner peripheral surfaces 21 and 22 to be movable in the inward/outward direction in the C direction. Each of the inside inner peripheral surfaces 21 and 22 is adapted to slidably come into partial contact with a corresponding one of the outer peripheral surfaces 42 and 43, excluding the outer peripheral surfaces on the rack teeth 4 side and the opposite side to the rack teeth 4 side of the rack shaft 5. Moreover, the endless annular elastic member 18 is fitted in the circumferential groove 16 of the bush 17. Therefore, the rack shaft 5 can be supported with predetermined rigidity in the C direction or the axial direction of the pinion 2, i.e., in the vertical direction in FIG. 8, the displacement of the rack shaft 5 in the axial direction of the pinion 2 can be suppressed by the pair of inside inner peripheral surfaces 21 and 22, and the movement thereof in the A direction can be movably supported with low frictional resistance. Moreover, the outside inner peripheral surfaces 27, 28, and 29 are respectively adapted to form the gaps 49, 51, and 52 with the outer peripheral surface 41 of the rack shaft 5 which is inserted and fitted in the through hole 47. Hence, coupled with the above, it is possible to reduce the effect of stress relaxation consequent upon creep deformation and thermal history.

Figure 9:
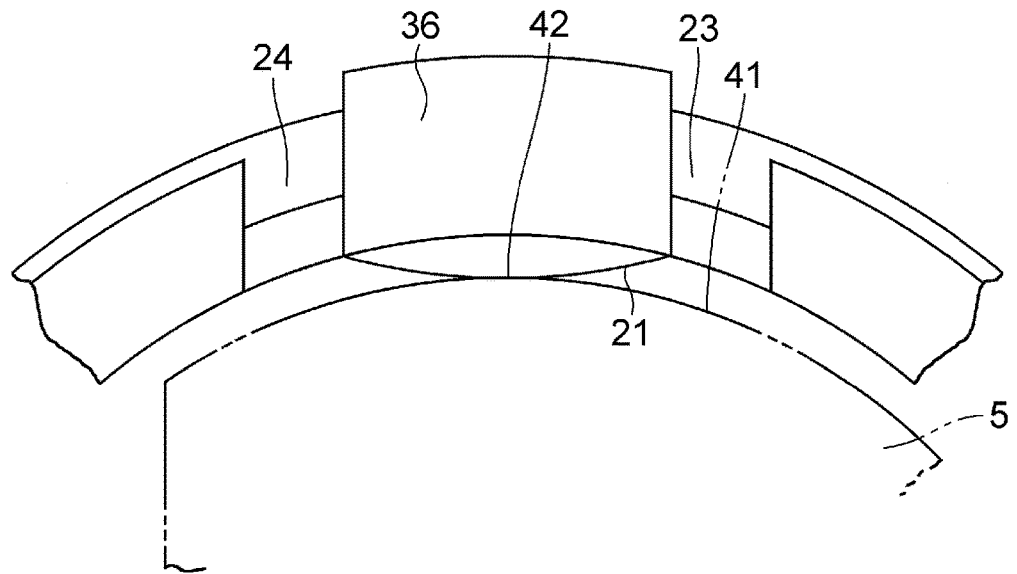
FIG. 9 is a partially enlarged explanatory view of another preferred embodiment of the invention.
Figure 10:
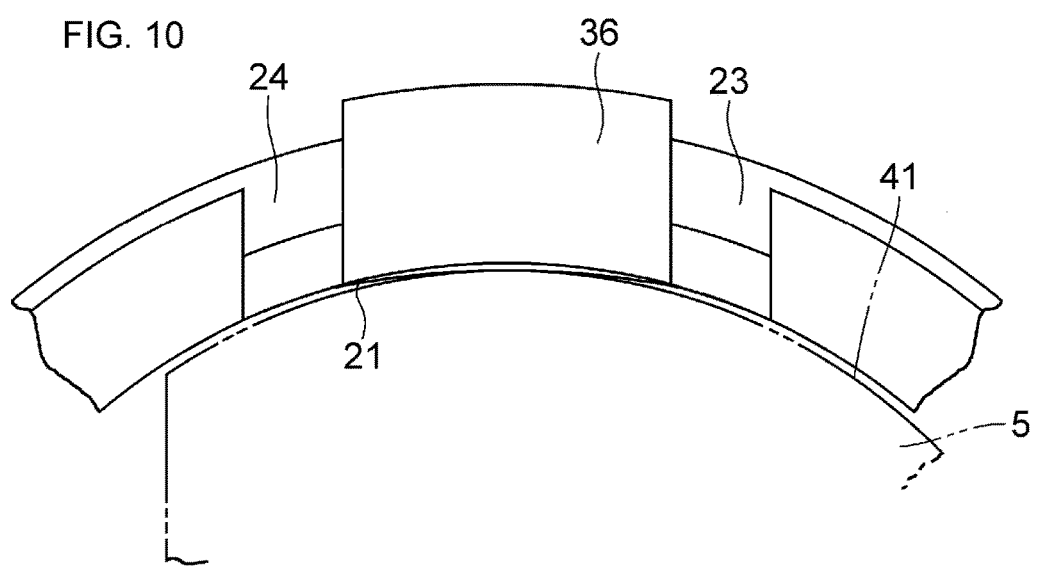
FIG. 10 is a partially enlarged explanatory view of still another preferred embodiment of the invention.

In the above-described embodiment, each of the inside inner peripheral surfaces 20, 21, and 22 has a flat surface shape, but may alternatively have a convex surface shape, as shown in FIG. 9, or may still alternatively have a concave surface shape having a greater radius of curvature than the radius of curvature of the outer peripheral surface 41 of the rack shaft 5, as shown in FIG. 10.

Figure 2:
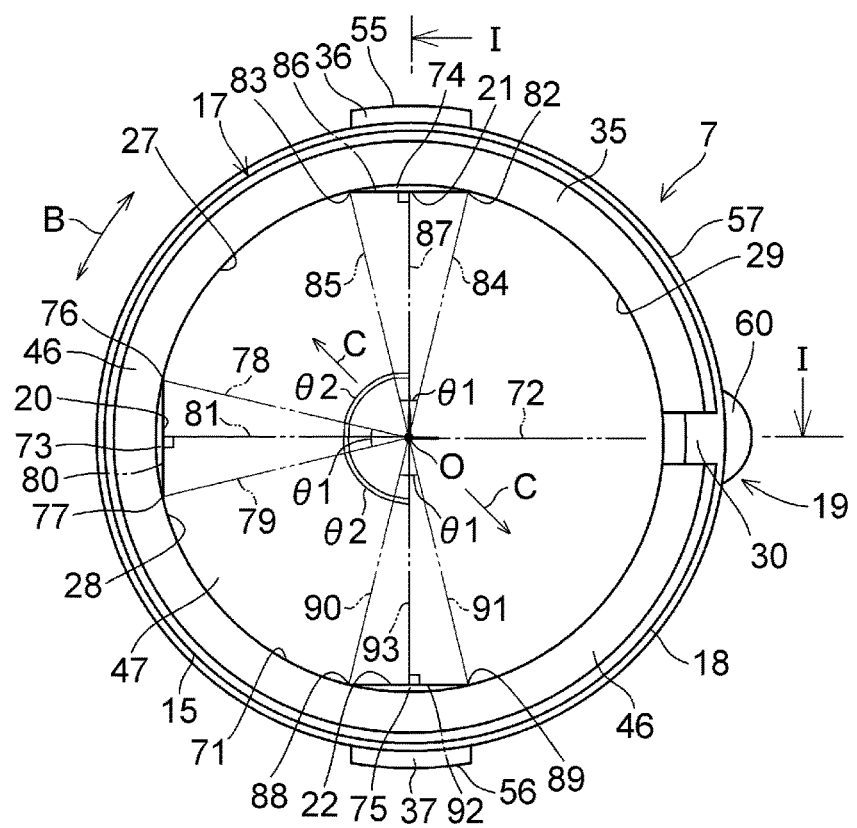
FIG. 2 is a left side elevational view of the embodiment shown in FIG. 1.
Figure 3:
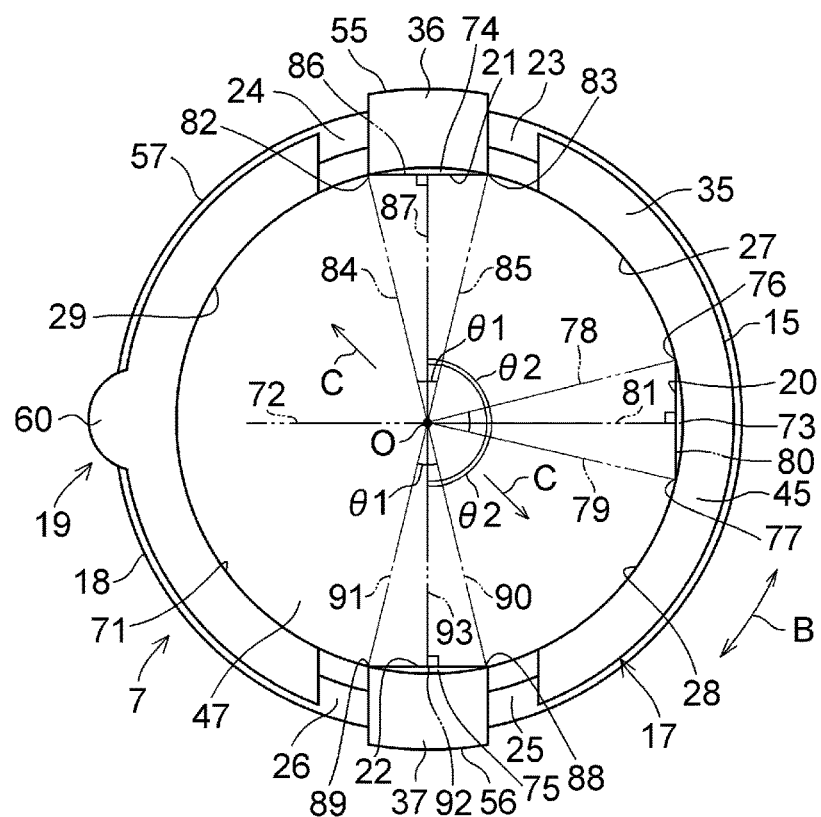
FIG. 3 is a right side elevational view of the embodiment shown in FIG. 1.
Figure 4:
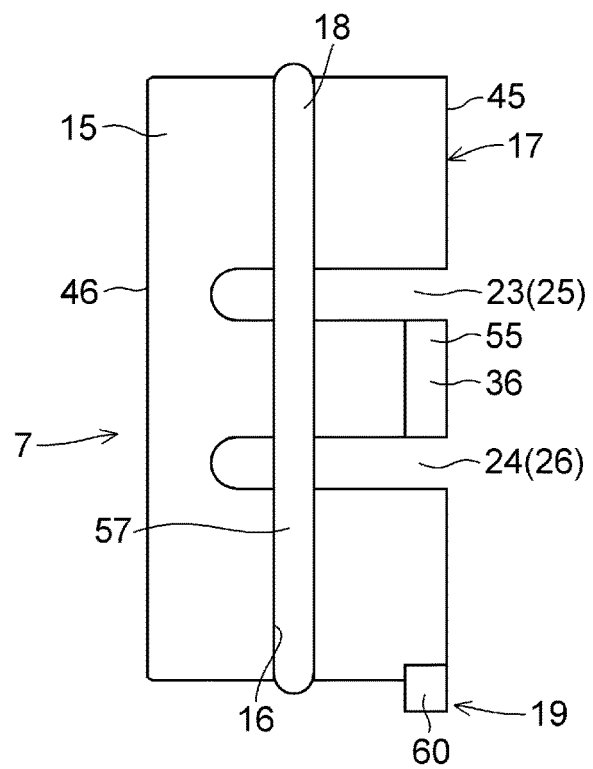
FIG. 4 is a plan view of the embodiment shown in FIG. 1.
Figure 5:
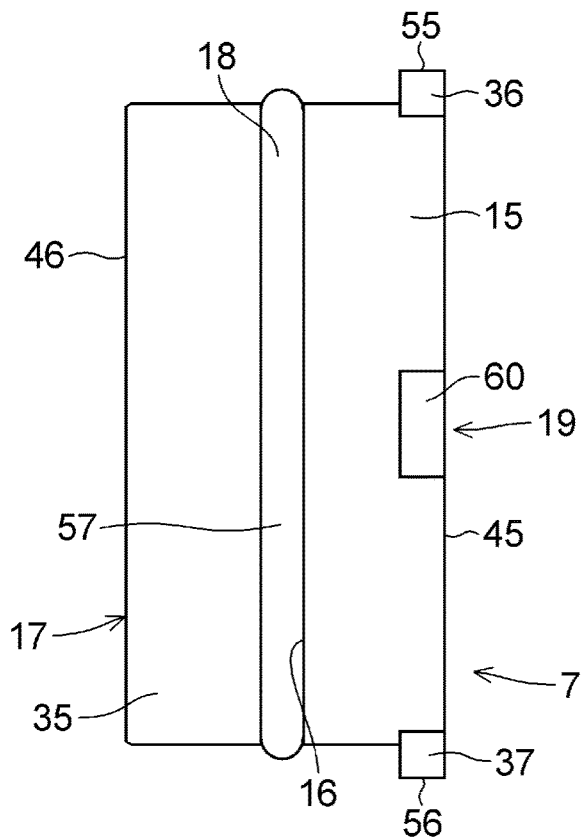
FIG. 5 is a bottom view of the embodiment shown in FIG. 1.
Figure 6:
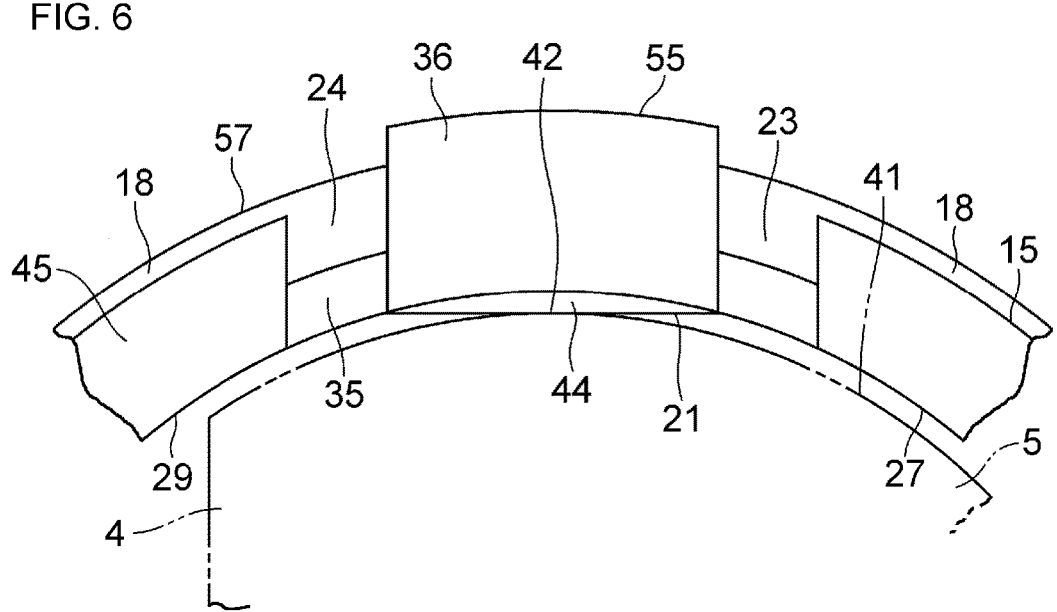
FIG. 6 is a partially enlarged explanatory view of the embodiment shown in FIG. 1.
Figure 11:
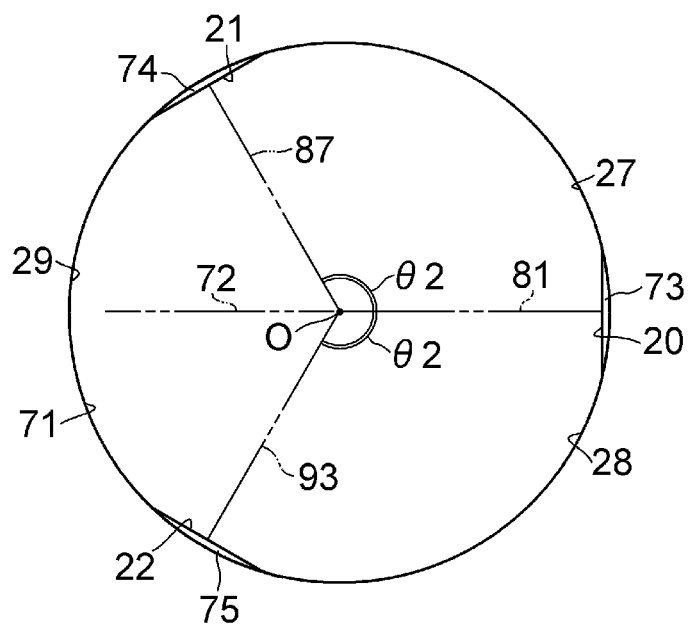
FIG. 11 is an explanatory view of a further preferred embodiment of the invention.
Figure 12:
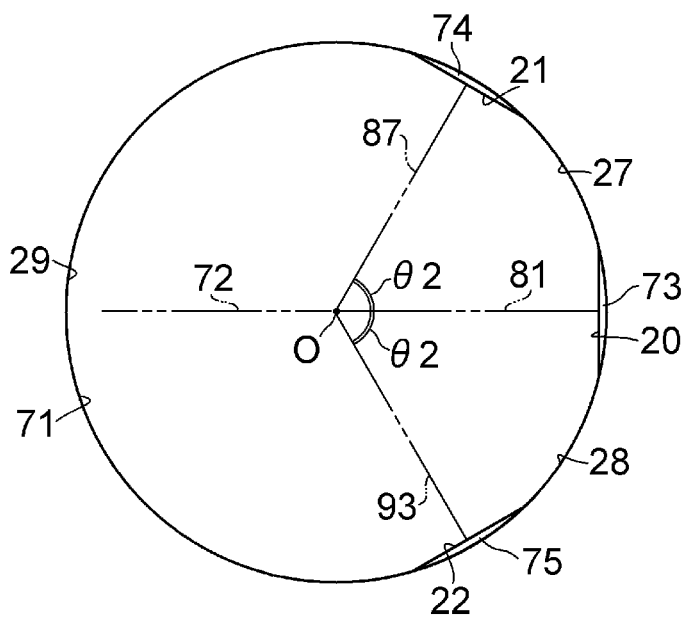
FIG. 12 is an explanatory view of a still further preferred embodiment of the invention.

In the bush bearing 7, the aforementioned angle $\theta 2$ may be 90°, as shown in FIGS. 2 and 3, or may be a greater angle than 90° such as 120°, as shown in FIG. 11, or may be a smaller angle than 90° such as 60°, as shown in FIG. 12.

Figure 13:
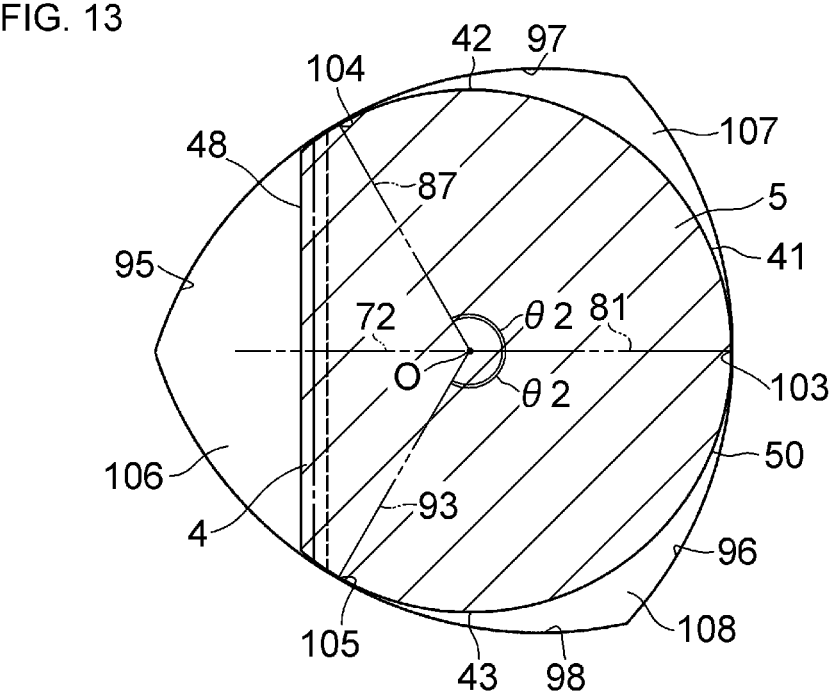
FIG. 13 is an explanatory view of a further preferred embodiment of the invention.

It should be noted that, instead of the inner peripheral surface 71 and the contact portions 73, 74, and 75 mentioned above, the bush 17 may have an inner peripheral surface 95 and contact portions 103, 104, and 105, as shown in FIG. 13. The inner peripheral surface 95 is constituted by three concave-shaped surfaces 96, 97, and 98 which meet each other, the contact portion 103 being disposed on the surface 96, the contact portion 104 being disposed on the surface 97, the contact portion 105 being disposed on the surface 98. The contact portion 103 is formed on the inner peripheral surface 95 so as to slidably come into contact with the outer peripheral surface 41 of the rack shaft 5 on the line 72 extending in a direction perpendicular to the A direction and the axial direction of the pinion 2; the contact portion 104 is formed on the inner peripheral surface 95 in such a manner as to be arranged with an interval with respect to the contact portion 103 in the B direction and so as to slidably come into contact with the outer peripheral surface 41 of the rack shaft 5 on one side of the line 72; and the contact portion 75 is formed on the inner peripheral surface 95 in such a manner as to be arranged with an interval with respect to the contact portion 103 in the B direction and disposed with the contact portion 103 interposed between the same and the contact portion 104 and so as to slidably come into contact with the outer peripheral surface 41 of the rack shaft 5 on the other side of the line 72. Each of the surfaces 96, 97, and 98 has a greater radius of curvature than the radius of curvature of the outer peripheral surface 41 of the rack shaft 5. At portions excluding the contact portions 103, 104, and 105 formed on the inner peripheral surface 95, the inner peripheral surface 95 is adapted to form gaps 106, 107, and 108 with respect to the outer peripheral surface 41 of the rack shaft 5 which is inserted and fitted in the through hole 47 defined by that inside inner peripheral surface 95 and the contact portions 103, 104, and 105. Each of the surfaces 96, 97, and 98 shown in FIG. 13 has a concave surface shape, but may have, for example, a convex surface shape or a flat surface shape.

DESCRIPTION OF REFERENCE NUMERALS

1: rack-and-pinion type steering apparatus
2: pinion
3: teeth
4: rack teeth
5: rack shaft
6: gear housing
7: bush bearing
12, 71, 95: inner peripheral surface
15, 41, 42, 43, 48, 50, 55, 56, 57: outer peripheral surface
16: circumferential groove
17: bush
18: endless annular elastic member
20, 21, 22: inside inner peripheral surface
23, 24, 25, 26, 30: slit
27, 28, 29: outside inner peripheral surface
71, 95: inner peripheral surface
73, 74, 75, 103, 104, 105: contact portion

The invention claimed is:
1. A bush bearing for allowing a rack shaft having rack teeth meshing with teeth of a pinion to be supported movably in an axial direction of the rack shaft, comprising: a synthetic resin-made bush having at least one circumferential groove in an outer peripheral surface thereof; and an endless annular elastic member which is fitted in the circumferential groove of said bush, wherein said bush has an inner peripheral surface defining a through hole for the insertion and fitting therein of the rack shaft; at least one slit which partially severs the inner peripheral surface in a circumferential direction; a first contact portion which is formed on the inner peripheral surface for slidably coming into contact with an outer peripheral surface of said rack shaft on a line extending in a direction perpendicular to the axial direction of said rack shaft and an axial direction of the pinion; a second contact portion which is formed on the inner peripheral surface for slidably coming into contact with the outer peripheral surface of said rack shaft; and a third contact portion which is formed on the inner peripheral surface for slidably coming into contact with the outer peripheral surface of said rack shaft, wherein the second and third contact portions are arranged with an interval with respect to the first contact portion in the circumferential direction with the first contact portion interposed therebetween in the circumferential direction, the second and third contact portions are arranged bilaterally symmetrically about the line, the second and third contact portions are each arranged at an equiangular interval with respect to the first contact portion in the circumferential direction, the first contact portion has a first inside inner peripheral surface for slidably coming into contact with the outer peripheral surface of said rack shaft, the second contact portion has a second inside inner peripheral surface for slidably coming into contact with the outer peripheral surface of said rack shaft, and the third contact portion has a third inside inner peripheral surface for slidably coming into contact with the outer peripheral surface of said rack shaft, the inner peripheral surface of said bush has a first outside inner peripheral surface which is disposed outwardly of the first to third contact portions in a radial direction and for being arranged with a first gap with respect to the outer peripheral surface of said rack shaft between the first and second contact portions, a second outside inner peripheral surface which is disposed outwardly of the first to third contact portions in a radial direction and for being arranged with a second gap with respect to the outer peripheral surface of said rack shaft between the first and third contact portions, and a third outside inner peripheral surface which is disposed outwardly of the first to third contact portions in a radial direction and for being arranged with a third gap with respect to the outer peripheral surface of said rack shaft between the second and third contact portions, wherein the first inside inner peripheral surface at a portion thereof is adapted to slidably come into linear contact with a first outer peripheral surface of said rack shaft on an opposite side to the rack teeth side, excluding a second outer peripheral surface of said rack shaft on the rack teeth side, in the outer peripheral surface of the rack shaft, the second inside inner peripheral surface at a portion thereof is adapted to slidably come into linear contact with a third outer peripheral surface on one side of the line, excluding the first and second outer peripheral surfaces of the rack shaft, in the outer peripheral surface of the rack shaft, the third inside inner peripheral surface at a portion thereof is adapted to slidably come into linear contact with a fourth outer peripheral surface on the other side of the line, excluding the first, second and third outer peripheral surfaces of the rack shaft, in the outer peripheral surface of the rack shaft, each of the first, second and third inside inner peripheral surfaces has a flat surface shape, and an angle at which a first perpendicular line in an isosceles triangle formed by two sides respectively extending in the radial direction toward a center of where said rack shaft would be positioned, in use from both edges in the circumferential direction of the first inside inner peripheral surface and by a side connecting the both edges and a second perpendicular line in an isosceles triangle formed by two sides respectively extending in the radial direction toward the center of where said rack shaft would be positioned, in use, from both edges in the circumferential direction of the second inside inner peripheral surface and by a side connecting the both edges intersect each other, is identical to an angle at which the first perpendicular line and a third perpendicular line in an isosceles triangle formed by two sides respectively extending in the radial direction toward the center of where said rack shaft would be positioned, in use, from both edges in the circumferential direction of the third inside inner peripheral surface and by a side connecting the both edges intersect each other.

2. The bush bearing according to claim 1, wherein each of the first, second and third inside inner peripheral surfaces has a center angle $\theta1$ of not less than 5° and not more than 90° about a center of said rack shaft.

3. The bush bearing according to claim 1, wherein each of the first, second and third contact portions protrudes from the inner peripheral surface of said bush toward the center of said rack shaft.

4. The bush bearing according to claim 1, wherein the inner peripheral surface of said bush is constituted by three convex-shaped, concave-shaped, or flat-shaped surfaces which are continuous to each other, and the first to third contact portions are respectively formed on the three surfaces.

5. The bush bearing according to claim 1, wherein the at least one slit is open at one of one end face and another end face in the axial direction of said bush and extends in the axial direction from the one of the one end face and the other end face to a vicinity of another one of the one end face and the other end face in the axial direction of the said bush past the circumferential groove.

6. The bush bearing according to claim 1, wherein said bush has a main body portion including the inner peripheral surface, the first, second and third contact portions, the outer peripheral surface, and the circumferential groove, and a plurality of protrusions provided integrally on the outer peripheral surface of the main body portion and spaced apart from each other in the circumferential direction, and the plurality of protrusions are adapted to come into contact with an inner peripheral surface of a housing through which the rack shaft is passed through.

7. The bush bearing according to claim 6, further comprising: positioning means for determining a position of said bush in the circumferential direction with respect to the inner peripheral surface of the housing.

8. A rack-and-pinion type steering apparatus for an automobile comprising: a pinion; a rack shaft having rack teeth meshing with teeth of said pinion; a housing through which said rack shaft is passed through; and the bush bearing according to claim 1 which is fitted in said housing and movably supports said rack shaft with respect to said housing.

9. A bush bearing for allowing a rack shaft having rack teeth meshing with teeth of a pinion to be supported movably in an axial direction of the rack shaft, comprising: a synthetic resin-made bush having at least one circumferential groove in an outer peripheral surface thereof; and an endless annular elastic member which is fitted in the circumferential groove of said bush, wherein said bush has an inner peripheral surface defining a through hole for the insertion and fitting therein of the rack shaft; at least one slit which partially severs the inner peripheral surface in a circumferential direction; a first contact portion which is formed on the inner peripheral surface for slidably coming into contact with an outer peripheral surface of said rack shaft on a line extending in a direction perpendicular to the axial direction of said rack shaft and an axial direction of the pinion; a second contact portion which is formed on the inner peripheral surface for slidably coming into contact with the outer peripheral surface of said rack shaft; and a third contact portion which is formed on the inner peripheral surface for slidably coming into contact with the outer peripheral surface of said rack shaft, the second and third contact portions are arranged bilaterally symmetrically about the line, the second and third contact portions are each arranged at an equiangular interval with respect to the first contact portion in the circumferential direction, the first contact portion has a first inside inner peripheral surface for slidably coming into contact with the outer peripheral surface of said rack shaft, the second contact portion has a second inside inner peripheral surface for slidably coming into contact with the outer peripheral surface of said rack shaft, and the third contact portion has a third inside inner peripheral surface for slidably coming into contact with the outer peripheral surface of said rack shaft, the inner peripheral surface of said bush has a first outside inner peripheral surface which is disposed outwardly of the first to third contact portions in a radial direction and for being arranged with a first gap with respect to the outer peripheral surface of said rack shaft between the first and second contact portions, a second outside inner peripheral surface which is disposed outwardly of the first to third contact portions in a radial direction and for being arranged with a second gap with respect to the outer peripheral surface of said rack shaft between the first and third contact portions, and a third outside inner peripheral surface which is disposed outwardly of the first to third contact portions in a radial direction and for being arranged with a third gap with respect to the outer peripheral surface of said rack shaft between the second and third contact portions, and an angle at which a first perpendicular line in an isosceles triangle formed by two sides respectively extending in the radial direction toward a center of where said rack shaft would be positioned, in use from both edges in the circumferential direction of the first inside inner peripheral surface and by a side connecting the both edges and a second perpendicular line in an isosceles triangle formed by two sides respectively extending in the radial direction toward the center of where said rack shaft would be positioned, in use, from both edges in the circumferential direction of the second inside inner peripheral surface and by a side connecting the both edges intersect each other, is identical to an angle at which the first perpendicular line and a third perpendicular line in an isosceles triangle formed by two sides respectively extending in the radial direction toward the center of where said rack shaft would be positioned, in use, from both edges in the circumferential direction of the third inside inner peripheral surface and by a side connecting the both edges intersect each other.

* * * * *